United States Patent [19]

Fujii et al.

[11] Patent Number: 4,508,570

[45] Date of Patent: Apr. 2, 1985

[54] AQUEOUS INK FOR INK-JET PRINTING

[75] Inventors: Tadashi Fujii, Yokohama; Tomoyuki Yamaguchi, Chiba; Kakuji Murakami, Kawasaki; Tomiko Kawakami; Hiroko Uenozono, both of Tokyo, all of Japan

[73] Assignee: Ricoh Company, Ltd., Tokyo, Japan

[21] Appl. No.: 434,779

[22] Filed: Oct. 18, 1982

[30] Foreign Application Priority Data

Oct. 21, 1981 [JP] Japan ................ 56-167267
Oct. 29, 1981 [JP] Japan ................ 56-172053

[51] Int. Cl.³ .............................................. C09D 11/02
[52] U.S. Cl. ........................................ 106/20; 106/22
[58] Field of Search .................................. 106/20, 22

[56] References Cited

U.S. PATENT DOCUMENTS 2,544,732  4/1928  Shechmeister .................. 427/394
4,285,727  8/1981  Uehara et al. ................... 106/22

FOREIGN PATENT DOCUMENTS 1526017  9/1978  United Kingdom .

OTHER PUBLICATIONS

*Chemical Abstracts*, vol. 78, No. 22, 1972, Abstract No. 138210k, Tryba et al., "Surface Active Agents from Oxyethylated Fatty Amines . . . ".

*Chemical Abstracts*, vol. 80, No. 12, 1973, Abstract No. 60821e, Ouchi, "Cationic Rubber–Asphalt Mixture Emulsion".

*Chemical Abstracts*, vol. 83, 22, 1975, Abstract No. 181091n, Timoshevskaya et al., "Complex Metal-Containing Azo Pigment.

*Chemical Abstracts, vol. 78, No. 24, Abstract No. 153710s, 1972,* Maeda, "Desensitizer Composition for Noncarbon, Pressure-Sensitive Copying".

*Primary Examiner*—Paul Lieberman

*Assistant Examiner*—Amelia B. Yarbrough

*Attorney, Agent, or Firm*—Flynn, Thiel, Boutell & Tanis

[57] ABSTRACT

An aqueous ink for ink-jet printing comprises as its main components (i) a water-soluble direct dye and/or acid dye, (ii) a polyhydric alcohol and/or an alkyl ether thereof, (iii) water, and (iv) at least one water-soluble non-ionic surface active agent selected from the group consisting of a polyoxyethylene alkyl amine of formula (I), a polyoxyethylene alkyl phenyl ether of formula (II) and a polyoxyethylene alkyl ether of formula (III):

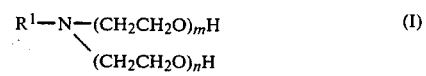

where $R^1$ represents a group derived from a chain hydrocarbon with 16 to 19 carbon atoms; m, an integer of 0 through 18; and n, an integer of 0 through 18; where m+n equals 8 through 18;

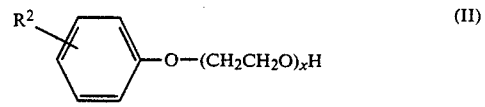

where $R^2$ represents a group derived from a chain hydrocarbon with 7 to 12 carbon atoms; and x represents an integer of 12 through 20;

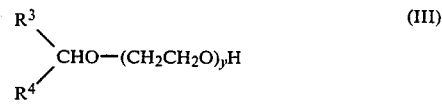

where $R^3$ and $R^4$ each represent a group derived from a chain hydrocarbon with 6 to 8 carbon atoms; and y represents an integer of 10 through 15.

22 Claims, No Drawings

AQUEOUS INK FOR INK-JET PRINTING

BACKGROUND OF THE INVENTION

The present invention relates to an improved aqueous ink for ink-jet printing.

Generally, ink for use in ink-jet printing should satisfy several conditions in order to yield an excellent print.

First, in order that the ink be compatible with ink droplet formation and control of the direction of the ejected ink droplet streams, it is necessary that its viscosity, surface tension, specific electric conductivity, and density each fall within certain appropriate ranges. It is necessary that no precipitates be separated, due to chemical change or other causes, from the ink during an extended period of storage, or during the periods when the apparatus is not in use. Nor should the physical properties of the ink otherwise change during the above-mentioned periods.

The diameter of each ink-jet nozzle in a conventional ink-jet printing apparatus is usually in the range of 10 microns to 60 microns, and, if the nozzles are plugged, for instance, with precipitates separated from the ink, it becomes impossible to eject the ink droplets from the nozzles. Even if the nozzles are not completely plugged, if solid components or viscous materials in the ink become affixed around the nozzle, or if the physical properties of the ink change, deviating from the predetermined physical properties achieved at the time of the preparation, the desired printing quality, the desired ink ejection stability, and the desired ink ejection response cannot be obtained.

Second, it is desired that the ink provide adequately high contrast and clearness in the printed image. If, however, the percentage of a dye contained in the ink is increased in an effort to increase the image contrast, the nozzles become easily plugged with the ink. Under such circumstances, a dye which is highly soluble in the solvent used in the ink, and which has a high extinction coefficient, is desired.

Third, it is necessary that the image printed by the ink dry rapidly. In a conventional ink for ink-jet printing, in order to prevent the ink from drying within the nozzle when printing is not actually taking place, a comparatively large amount of a wetting agent is contained in the ink, and, as a result, in order to speed up the drying of the printed images, a special paper with high ink-absorption capacity is used. This not only results in a substantial spreading of the image, but precludes the use of many conventional types of paper.

Fourth, it is necessary that the ink for ink-jet printing be such that the printed images are resistant to water, light and physical wear.

So far, many proposals have been made for an ink for ink-jet printing, but from the viewpoint of practical use, a satisfactory ink which is capable of meeting the above-described requirements has not been found.

SUMMARY OF THE INVENTION

It is therefore an object of the present invention to provide an aqueous ink for ink-jet printing completely satisfying the above outlined conditions. That is to say, the object of the present invention is to provide an aqueous ink for ink-jet printing which does not result in plugging of the nozzle, and does not change in quality or separate precipitates therefrom with time during storage, but exhibits excellent ink ejection stability, has good ink ejection response, shows slight changes in physical properties, if any, when used for a long period with continuous recirculation, or when used intermittently, and yields printed images which are non-spreading, have superior water resistance, high sharpness, and high image density.

According to the present invention, the above object can be attained by an aqueous ink for ink-jet printing comprising as its main components (i) a water-soluble direct dye and/or acid dye, (ii) a polyhydric alcohol and/or an alkyl ether thereof, (iii) water, and (iv) at least one water-soluble non-ionic surface active agent selected from the group consisting of a polyoxyethylene alkyl or alkenyl amine of formula (I), a polyoxyethylene alkyl phenyl ether of formula (II) and a polyoxyethylene alkyl ether of formula (III):

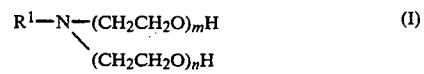

where $R^1$ represents a group derived from a chain hydrocarbon with 16 to 19 carbon atoms; m, an integer of 0 through 18; and n, an integer of 0 through 18; where m+n equals 8 through 18,

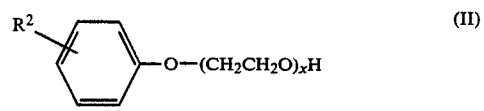

where $R^2$ represents a group derived from chain hydrocarbon with 7 to 12 carbon atoms; and x represents an integer of 12 through 20,

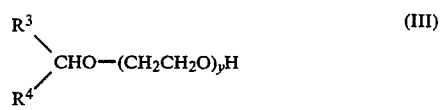

where $R^3$ and $R^4$ each represent a group derived from a chain hydrocarbon with 6 to 8 carbon atoms; and y represents an integer of 10 through 15.

DETAILED DESCRIPTION OF THE PREFERRED EMBODIMENTS

An embodiment of an aqueous ink for ink-jet printing according to the present invention comprises as its main components (i) a water-soluble direct dye and/or acid dye, (ii) a polyhydric alcohol and/or an alkyl ether of a polyhydric alcohol, (iii) water, and (iv) a polyoxyethylene alkyl or alkenyl amine of the following formula (I), which serves as a water-soluble non-ionic surface active agent:

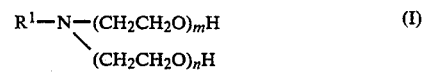

where $R^1$ represents a group derived from a chain hydrocarbon with 16 to 19 carbon atoms; m, an integer of 0 through 18; and n, an integer of 0 through 18, where m+n equals 8 through 18.

As mentioned above, in the above general formula (I), $R^1$ is a group derived from a chain hydrocarbon with 16 to 19 carbon atoms, preferably a group derived from an unsaturated chain hydrocarbon, most preferably an oleyl group, a linoleyl group or a linolenyl group.

In the above general formula (I), if the number of carbon atoms and the values of m and n exceed the above-mentioned ranges, the nozzles become plugged if the ink is not used for a long period, and the ink ejection stability and the ink ejection response are significantly degraded.

An appropriate amount of the polyoxyethylene alkyl amine to be added is in the range of 0.01 wt.% to 2.00 wt.%, preferably in the range of 0.05 wt.% to 1.00 wt.%. If the amount is less than 0.01 wt.%, adequate results are not obtained, while, if the amount exceeds 2.00 wt.%, a plugging tendency will develop in the ink-jet nozzles when the apparatus has not been used for a long period of time, and the ink ejection stability and ink-ejection response will diminish very strikingly.

The surface tension of an aqueous solution of 0.01 wt.% of the polyoxyethylene alkyl amine is below 40 dynes/cm (at 25° C.). However, when one of the above-mentioned dyes is added thereto, the surface tension of the aqueous solution increases to 40 dynes/cm or more at 25° C. As a matter of course, the surface tension of an ink in which the polyoxyethylene alkyl amine and the dye are contained is 40 dynes/cm or more at 25° C. This indicates that the polyoxyethylene alkyl amine forms a complex or a mixed micelle in combination with the dye, which results in a more stable solution in water and ink than would result with the dye by itself, thus achieving the object of the present invention.

In the present invention, in order to prevent spreading of the image and to secure ink ejection stability, it is necessary to adjust the surface tension of the ink to a value of 40 dynes/cm (at 25° C.) or more.

The polyoxyethylene alkyl amines for use in the present invention exhibit exceedingly high hydrolysis stability and dissolution stability in an alkaline ink when the pH is in the range of 9.0 to 11.0. The water-soluble direct dye and the water-soluble acid dye also exhibit high dissolution stability in a solution with a pH ranging from 9.0 to 11.0. When the above-mentioned polyoxyethylene alkyl amine is added to the ink with that pH range, the solubility and dissolution stability of the above-mentioned dyes markedly increase. Therefore, it is important to add to the ink the polyoxyethylene alkyl amine, together with at least the water-soluble direct dye or the water-soluble acid dye, and to adjust the pH of the ink to be in the range of 9.0 to 11.0, when the present invention is practiced.

Another embodiment of an aqueous ink for ink-jet printing according to the present invention comprises as its main components (i) a water-soluble direct dye/or acid dye, (ii) glycerin, (iii) diethylene glycol, (iv) water, and (v) at least one polyoxyethylene alkyl phenyl ether represented by the formula (II) or a polyoxyethylene alkyl ether represented by the formula (III), each of which serves as a water-soluble non-ionic surface active agent:

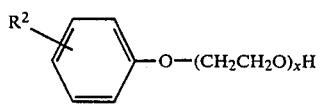
(II)

where $R^2$ represents a group derived from a chain hydrocarbon with 7 to 12 carbon atoms; and x represents an integer of 12 through 20;

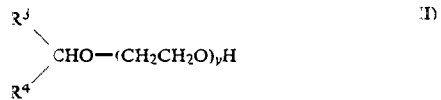
(III)

where $R^3$ and $R^4$ each represent a group derived from a chain hydrocarbon with 6 to 8 carbon atoms; and y represents an integer of 10 through 15.

In this embodiment, the polyoxyethylene alkyl amine of the previously described formula (I) can be used in combination with one or both of the above-mentioned water-soluble non-ionic surface active agents.

In this embodiment, it is preferable to employ in the ink a mixed solvent of glycerin and ethylene glycol as a wetting agent. By use of this mixed solvent in the ink, the desired ink ejection stability and described ink ejection response can be obtained. In particular, the ink ejection response after the ink has not been used for a long period time is significantly improved by use of that mixed solvent. The appropriate range of mixing ratios of glycerin to diethylene glycol is (1:1) to (1:5).

In the case of the polyoxyethylene alkyl phenyl ether represented by the formula (II), if the number of carbon atoms in the group represented by $R^2$ and the value of x exceed the above-mentioned ranges, the nozzles become plugged when the ink has not been used for a long period of time, and the ink ejection stability and the ink ejection response are significantly degraded. In order to obtain the desired ink ejection stability and ink ejection response, it is preferable that the number of carbon atoms in the group represented by $R^2$ be in the range of 8 to 10, and n be an integer of 13 through 19.

An appropriate amount of the polyoxyethylene alkyl phenyl ether is in the range of 0.01 wt.% to 1.00 wt.%, preferably in the range of 0.05 wt.% to 0.50 wt.%. If the amount is less than 0.01 wt.%, adequate results are not obtained, while if the amount exceeds 1.00 wt.%, a plugging tendency will develop in the ink-jet nozzles when the apparatus has not been used for a long period of time, and the ink ejection stability and ink ejection response considerably decrease.

The amount of the polyoxyethylene alkyl phenyl ether to be added varies slightly depending upon the ambient temperature. The above-mentioned range of the amount, that is, 0.01 wt.% to 1.00 wt.%, is suitable when the ambient temperature is in the range of 15° C. to 50° C. When the ambient temperature is in the range of 5° C. to 10° C., the preferable amount is in the range of 0.01 wt.% to 0.50 wt.%.

When the added amount of the polyoxyethylene alkyl phenyl ether is in the range of 0.01 wt.% to 1.00 wt.%, the surface tension of an aqueous solution of the polyoxyethylene alkyl phenyl ether and one of the previously mentioned dyes, and the surface tension of an ink containing the polyoxyethylene alkyl phenyl ether and the dye, are both 45 dynes/cm or more at 25° C. In contrast, the surface tension of an aqueous solution of the polyoxyethylene alkyl phenyl ether without any dye is less than 45 dynes/cm at 25° C. when the amount of the polyoxyethylene alkyl phenyl ether is 0.005 wt.%. This indicates that the polyoxyethylene alkyl phenyl ether represented by the formula (II) forms a complex or a mixed micelle in combination with the dye, which results in a more stable solution in water and ink than would result with the dye by itself, thus achieving the object of the present invention.

The polyoxyethylene alkyl phenyl ethers of the formula (II) for use in the present invention exhibit exceedingly high hydrolysis stability and dissolution stability in an alkaline ink when the pH is in the range of 9.0 to 11.0. The water-soluble direct dye and the water-soluble acid dye also exhibit high dissolution stability in a solution with a pH ranging from 9.0 to 11.0. When the above-mentioned polyoxyethylene alkyl phenyl ether is added to the ink with that pH range, the solubility and dissolution stability of the above-mentioned dye increase markedly.

In the case of the polyoxyethylene alkyl ether represented by the formula (III), if the number of carbon atoms in the groups represented by $R^3$ and $R^4$ and the value of y exceed the previously mentioned ranges, the nozzles become plugged when the ink has not been used for a long period of time, and the ink ejection stability and the ink ejection response are significantly degraded.

An appropriate amount of the polyoxyethylene alkyl ether is in the range of 0.01 wt.% to 1.00 wt.%, preferably in the range of 0.05 wt.% to 0.80 wt.%. If the amount is less than 0.01 wt.%, adequate results are not obtained, while, if the amount exceeds 1.00 wt.%, a plugging tendency will develop in the ink-jet nozzles when the apparatus has not been used for a long period of time, and the ink ejection stability and ink ejection response considerably decrease.

The amount of the polyoxyethylene alkyl ether to be added varies slightly depending upon the ambient temperature. The above-mentioned range of the amount, that is, 0.01 wt.% to 1.00 wt.% , is suitable when the ambient temperature is in the range of 15° C. to 50° C. When the ambient temperature is in the range of 5° C. to 10° C., the preferable amount is in the range of 0.01 wt.% to 0.80 wt.%.

When the added amount of the polyoxyethylene alkyl ether is in the range of 0.01 wt.% to 1.00 wt.%, the surface tension of an aqueous solution of the polyoxyethylene alkyl ether and one of the previously mentioned dyes, and the surface tension of an ink containing the polyoxyethylene alkyl ether and the dye, are both 40 dynes/cm or more at 25° C. In contrast, the surface tension of an aqueous solution of the polyoxyethylene alkyl ether without any dye is less than 40 dynes/cm at 25° C. when the amount of the polyoxyethylene alkyl phenyl ether is 0.003 wt.%. This indicates that the polyoxyethylene alkyl ether represented by the formula (III) forms a complex or a mixed micelle in combination with the dye, which results in a more stable solution in water and ink than would result with the dye by itself, thus achieving the object of the present invention.

The polyoxyethylene alkyl ethers of the formula (III) for use in the present invention exhibit exceedingly high hydrolysis stability and dissolution stability in an alkaline ink when the pH is in the range of 9.0 to 11.0. The water-soluble direct dye and the water-soluble acid dye also exhibit high dissolution stability in a solution with a pH ranging from 9.0 to 11.0. When the above-mentioned polyoxyethylene alkyl ether is added to the ink with that pH range, the solubility and dissolution stability of the above-mentioned dyes increase markedly.

Dyes which can be advantageously employed in the present invention are water-soluble direct dyes and/or water soluble acid dyes, by which an ink which satisifies the previously described characteristics can be obtained. These dyes are employed by dissolving them in appropriately selected solvents. Examples of representative dyes are given below. Obviously, since this list is only representative, other dyes with similar chemical structures can also be used.

| Direct Dyes | | | | | | | |
|---|---|---|---|---|---|---|---|
| C.I. Direct Yellow | 1, | 8, | 11, | 12, | 24, | 26, | 27, |
| | 33, | 39, | 44, | 50, | 58, | 85, | 86, |
| | 88, | 98, | 100, | 110 | | | |
| C.I. Direct Red | 1, | 2, | 4, | 9, | 11, | 13, | 17, |
| | 20, | 23, | 24, | 28, | 31, | 33, | 37, |
| | 39, | 44, | 62, | 81, | 83, | 99, | 227 |
| C.I. Direct Blue | 1, | 2, | 6, | 8, | 15, | 22, | 25, |
| | 71, | 76, | 78, | 86, | 98, | 108, | 120, |
| | 192, | 193, | 194, | 195, | 196, | 199, | 200, |
| | 201, | 202, | 203, | 207, | 236, | 237 | |
| C.I. Direct Black | 2, | 4, | 17, | 19, | 22, | 32, | 38, |
| | 51, | 56, | 62, | 71, | 74, | 75, | 77, |
| | 105, | 108, | 112, | 154 | | | |
| Acid Dyes | | | | | | | |
| C.I. Acid Yellow | 7, | 17, | 23, | 29, | 42, | 99 | |
| C.I. Acid Orange | 56, | 64 | | | | | |
| C.I. Red | 18, | 87, | 92, | 94 | | | |
| C.I. Acid Blue | 1, | 7, | 9, | 234, | 236 | | |
| C.I. Acid Green | 12, | 19, | 27, | 41 | | | |
| C.I. Acid Black | 1, | 2, | 7, | 24, | 94 | | |

Particularly preferable water-soluble acid dyes are polyazo dyes represented by the following general formulae (A), (B), (C) or (D):

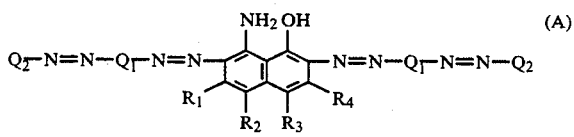

(A)

where $Q_1$ and $Q_2$ each are an unsubstituted benzene ring or naphthalene ring, or a benzene ring or naphthalene ring substituted by an amino group, a hydroxyl group or a sulfo group; $R_1$ to $R_4$ each represent hydrogen or a sulfo group, those sulfo groups being in the form of sodium salts, potassium salts, or quaternary ammonium salts. Each molecule contains 2 to 6 sulfo groups.

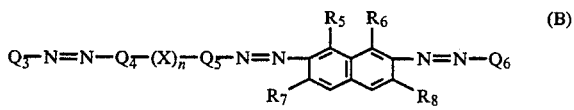

(B)

where $Q_3$ and $Q_6$ each represent an unsubstituted or substituted phenyl group, or an unsubstituted or substituted naphthyl group; $Q_4$ and $Q_5$ each represent an unsubstituted or substituted 1,4-phenylene group or naphthylene group; $R_5$ and $R_6$ each represent hydrogen, a hydroxyl group or amino group; $R_7$ and $R_8$ each represent hydrogen or a sulfo group, those sulfo groups being in the form of sodium salts, potassium salts or quaternary ammonium salts. Each molecule has 2 to 6 sulfo groups, and x can be any one of NH, N=N, or CH=CH, and n is an integer 0 or 1.

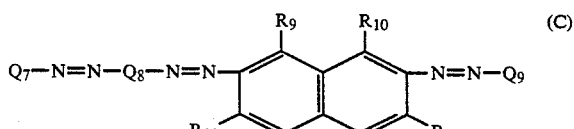

(C)

where $Q_7$ and $Q_9$ each represent an unsubstituted or substituted phenyl group or naphthyl group; $Q_8$ represents an unsubstituted or substituted 1,4-phenylene group, 1,4-naphthylene group or 4,4'-biphenylene group; $R_9$ and $R_{10}$ each represent hydrogen, a hydroxyl group or an amino group; $R_{11}$ and $R_{12}$ each represent hydrogen or a sulfo group, those sulfo groups being in the form of sodium salts, potassium salts, or quaternary ammonium salts. Each molecule contains 2 to 6 sulfo groups.

sents an unsubstituted or substituted 1,4-phenylene group, 1,4-naphthylene group or 4,4'-biphenylene group; $R_{13}$ and $R_{14}$ each represent hydrogen, a hydroxyl group or an amino group; $R_{15}$ and $R_{16}$ each represent hydrogen or a sulfo group, those sulfo groups being in the form of sodium salts, potassium salts, or quaternary ammonium salts. Each molecule has 2 to 6 sulfo groups.

Specific examples of the dyes represented by the formula (A) are as follows:

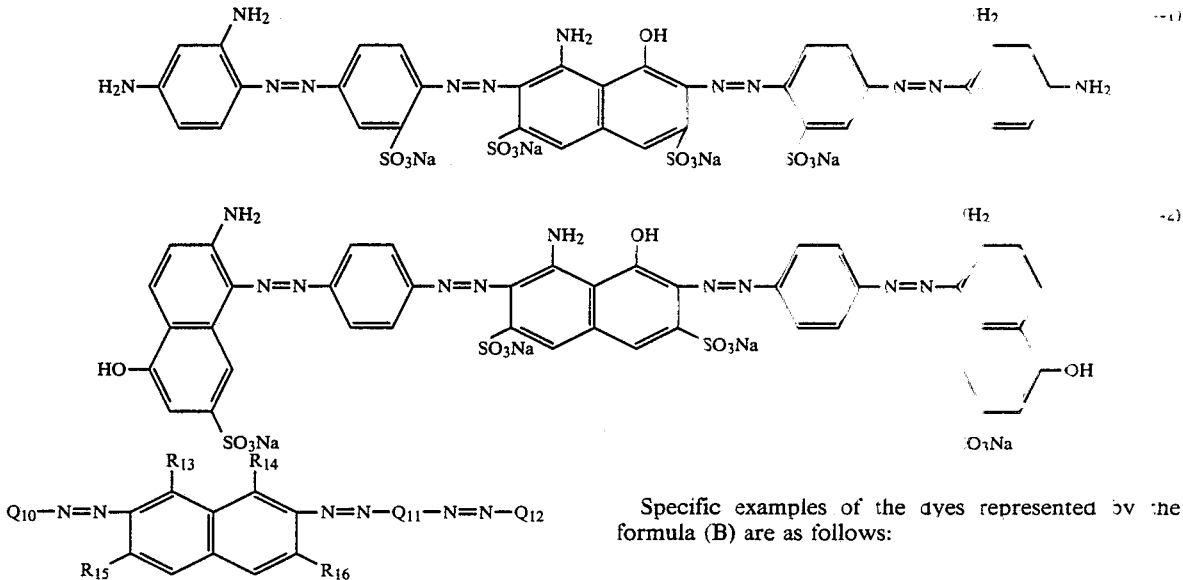

Specific examples of the dyes represented by the formula (B) are as follows:

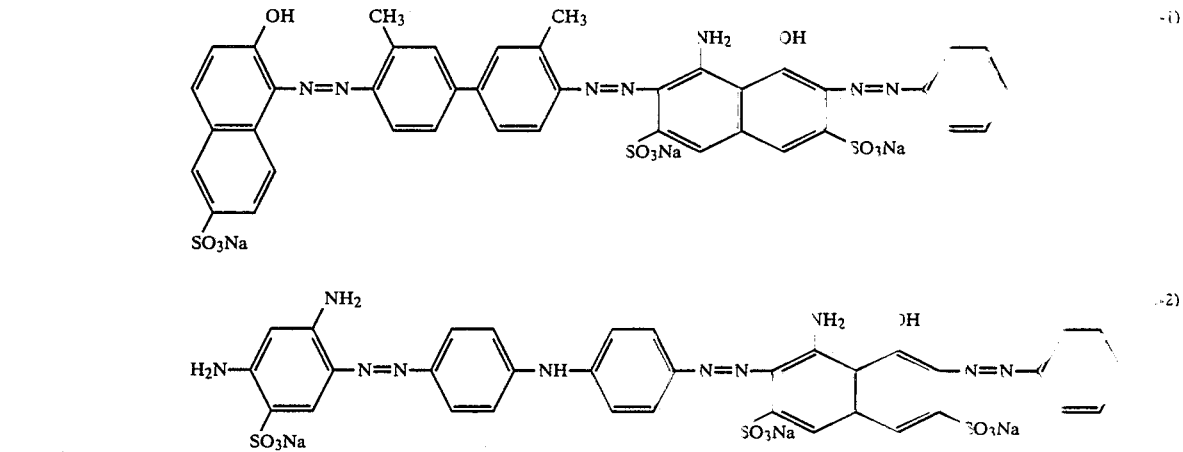

A specific example of the dyes represented by the formula (C) is as follows:

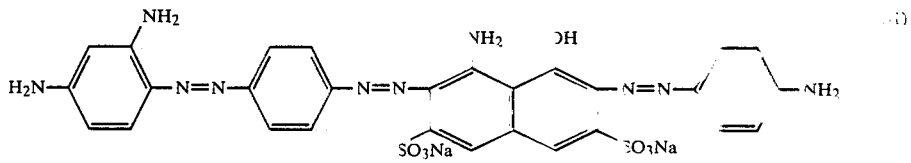

where $Q_{10}$ and $Q_{12}$ each represent an unsubstituted or substituted phenyl group or naphthyl group; $Q_{11}$ repre- A specific example of the dyes represented by the formula (D) is as follows:

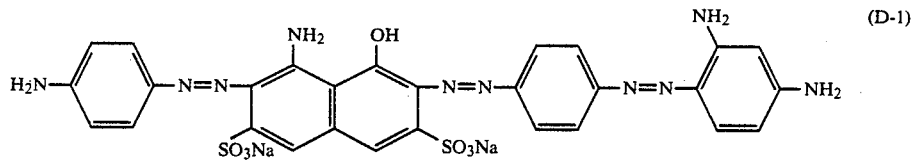

(D-1)

The polyhydric alcohols that can be employed in the present invention are, for example, ethylene glycol, diethylene glycol, triethylene glycol, propylene glycol, glycerin, and polyethylene glycol.

The alkyl ethers of polyhydric alcohols that can be employed in the present invention are, for example, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, and triethylene glycol monoethyl ether.

The polyhydric alcohols and alkyl ethers thereof can be used effectively as mixed solvents with glycerin. Glycerin and diethylene glycol make an especially effective mixed solvent.

In particular, in the case of the second embodiment of an aqueous ink for ink-jet printing according to the present invention, which employs at least one of the water-soluble non-ionic surface active agents represented by the previously described formula (II) and another water-soluble non-ionic surface active agent represented by the previously described formula (III), the mixed solvent of glycerin and diethylene glycol is used as an indispensable wetting agent as mentioned previously. However, when one of the just mentioned polyhydric alcohols and alkyl ethers of polyhydric alcohols is also used in combination with the mixed solvent of glycerin and diethylene glycol, the maximum amount of the selected polyhydric alcohol or alkyl ether thereof is 40 wt.% of the total weight of the wetting agent.

In the present invention, water is used as a solvent component, but it is possible to use the following water-soluble organic solvents mixed with water:

Solvents of amines, such as triethanol amine; solvents of compounds containing nitrogen-containing heterocyclic rings, such as N-methyl-2-pyrrolidone, 2-pyrrolidone, 1,3-dimethyl imidazolidinone; intermolecular esters of hydroxy-carboxylic acids, such as valerolactones and caprolactones; solvents of cellosolve acetates, such as ethylene glycol monomethyl ether acetate.

In the present invention, as viscosity adjustment agents, any materials can be used optionally from among many generally well known chemicals, so far as they do not have adverse effects on the solvents and dyes used. Some of these chemicals are polyvinyl alcohol, hydroxyethyl cellulose, carboxymethyl cellulose, methyl cellulose, water-soluble acrylic resin, arabic gum, dextrin, casein, pectin, tragacanth gum, and polyvinyl pyrrolidone.

In the present invention, as pH adjustment agents, any materials can be used optionally, so long as they do not have an adverse effect on the ink, and can control the pH of the ink within the range of pH 9.0 to 11.0.

Examples of such pH adjustment agents are amines, such as diethanol amine and tri-ethanol amine; hydroxides of alkali metals, such as sodium hydroxide, and potassium hydroxide; and ammonium hydroxide.

Other materials which can be utilized as additives are given below.

In order to maintain the specific electric conductivity of the ink above 1 $m\Omega^{-1} \cdot cm^{-1}$ (at 25° C.), specific electric conductivity adjustment agents are used. Examples are inorganic salts such as potassium chloride, ammonium chloride, sodium sulfate, and sodium carbonate; water-soluble amines such as triethanolamine; and quarternary ammonium salts such as tetramethylammonium bromide.

As chelating agents, for example, the following chemicals can be employed: disodium ethylenediaminetetraacetate, trisodium nitrilotriacetate, hydroxyethyl ethylenediamine trisodium acetate, diethylene triamino pentasodium acetate and uramil disodium acetate.

As rust preventing agents for the nozzles, for example, the following chemicals can be employed: acid sulfites, sodium thiosulfate, ammonium thioglucolate, diisopropyl ammonium nitrite, pentaerythritol tetranitrate and dicyclohexyl ammonium nitrite.

As water-soluble preservative and anti-mold agents, for example, the following chemicals can be employed: 2,2-dimethyl-6-acetoxy-dioxane-1,3,dehydrosodium acetate, p-hydroxy benzoic acid butyl ester, potassium sorbate, 2-pyridine thiol-1-oxidesodium salt, anionic surface active agents, Deltop 33 (commercially available from Takeda Chemical Industries Ltd.), and Bioside 880 (commercially available from Taisho Co., Ltd.).

Other additives, for example, water-soluble ultraviolet-ray-absorbing agents, water-soluble infrared-ray-absorbing agents and magnetic fluids in which ultrafine magnetite particles are dispersed, can be employed as thought necessary in specific embodiments of an aqueous ink for ink-jet printing according to the present invention, or for use in specific apparatus.

Preferred embodiments of an aqueous ink for ink-jet printing of the type containing the polyoxyethylene alkyl amine of the previously described formula (I) will now be described by referring to the following Examples 1 through 7:

EXAMPLE 1

A mixture of the following components was heated to 70° C., stirred until completely dissolved, then filtered twice through a membrane filter with a 0.45 μm mesh to yield an embodiment of an aqueous ink for ink-jet printing according to the present invention:

|  | wt. % |
|---|---|
| C.I. Direct Black 154 | 3.30 |
| Polyethylene glycol 200 | 15.00 |
| Polyoxyethylene oleyl amine (containing 10 ethylene oxide groups) | 0.50 |
| Dehydrosodium acetate | 0.20 |
| Sodium thiosulfate | 0.01 |
| Ethylene diamine tetrasodium acetate | 0.01 |
| Ion-exchanged water | 80.98 |

The properties of the thus prepared ink were as follows:

| | | |
|---|---|---|
| Surface tension | γ = 47.0 dynes/cm | (25° C.) |
| Viscosity | η = 1.65 cP | (30° C.) |
| | pH = 10.2 | (25° C.) |
| Specific electric conductivity | κ = 2.2 mΩ$^{-1}$·cm$^{-1}$ | (25° C.) |

The ink was then subjected to the following tests:

(1) Image Clarity and Image Dryness Test

The ink was caused to issue from a nozzle with an inner diameter of 30 μm, with vibrations at a frequency of 100 KHz, by which vibrations the ink was ejected in a stream broken into individual drops, and was then caused to impinge on commercially available high quality paper. As a result, clear images were obtained on the paper. The time required for drying the printed image was not more than 10 seconds at normal room temperature and humidity.

(2) Preservability Test

Samples of the ink were tightly sealed in glass containers and subjected to the following storage tests
a. Preserved for one month at −20° C.;
b. Preserved for one month at 4° C.;
c. Preserved for one year at 20° C.; and
d. Preserved for one week at 90° C.

Separation of precipitates from the ink was not observed at all in storage. In addition, no changes were detected in the properties or color of the ink.

(3) Ink Droplet Ejection Stability Test

Ink-jet printing as was done in the above-described Image Clarity and Image Dryness Test was continuously performed for 1,000 hours. There was no evidence of either clogging of the nozzle or change in ejection direction of the ink droplets; rather, stable printing was maintained.

(4) Ink Droplet Ejection Response Test

After ink-jet printing was performed as outlined in (1), the apparatus and ink were allowed to stand for one month at room temperature and humidity, after which they were used again to perform ink-jet printing under the same conditions as previously stated in (1). As in (3) above, there was no change in the ink droplet ejection stability.

The above test was repeated in the same manner, except that the apparatus and ink were allowed to stand for one week at 40° C., 30% RH, instead of being allowed to stand for one month at room temperature and humidity. The result was that again no change was observed in the ink droplet ejection stability.

EXAMPLE 2

Example 1 was repeated except that the components of the ink employed in Example 1 were replaced by the following components:

| | wt. % |
|---|---|
| C.I. Direct Black 19 | 20 |
| Polyethylene glycol 200 | .30 |
| Triethylene glycol monomethyl ether | .00 |
| Polyoxyethylene linoleyl amine (containing 12 ethylene oxide groups) | .01 |
| 2,2-dimethyl-6-acetoxy-dioxane-1,3 | .20 |
| Ethylene diamine tetrasodium acetate | .01 |
| Ion-exchanged water | 0.78 |

The properties of the ink were:

| | | |
|---|---|---|
| Surface tension | γ = 52.0 dynes/cm | (25° C.) |
| Viscosity | η = 1.70 cP | (30° C.) |
| | pH = 10.5 | (25° C.) |
| Specific electric conductivity | κ = 2.5 mΩ$^{-1}$·cm$^{-1}$ | (25° C.) |

EXAMPLE 3

Example 1 was repeated except the components of the ink employed in Example 1 were replaced by the following components:

| | wt. % |
|---|---|
| C.I. Direct Black 19 | 20 |
| Glycerin | 15 |
| Diethylene glycol | .25 |
| Polyoxyethylene oleyl amine (containing 15 ethylene oxide groups) | .20 |
| 2-pyridine thiol-1-oxide sodium salt | 20 |
| Ion-exchanged water | 0.50 |

The properties of the ink were:

| | | |
|---|---|---|
| Surface tension | γ = 45.0 dynes/cm | (25° C.) |
| Viscosity | η = 1.60 cp | (30° C.) |
| | pH = 10.5 | (25° C.) |
| Specific electric conductivity | κ = 2.3 mΩ$^{-1}$·cm$^{-1}$ | (25° C.) |

EXAMPLE 4

Example 1 was repeated except that the components of the ink employed in Example 1 were replaced by the following components:

| | wt. % |
|---|---|
| 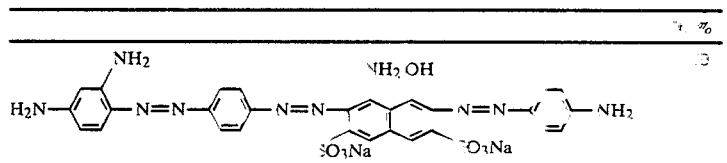 (previously described dye C-1) | .3 |
| Glycerin | .2 |
| Polyethylene glycol 200 | .2 |
| Polyoxyethylene oleyl amine (containing 12 ethylene oxide groups) | .3 |
| Preservative and anti-mold agent (organic nitrogen-sulfur containing material tradename - Deltop 33, produced by Takeda Chemical Industries, Ltd.) | .2 |

| | Wt. % |
|---|---|
| Ion-exchanged water | 80.80 |

The properties of the ink were:

| Viscosity | $\eta$ = 1.60 cP | (30° C.) |
|---|---|---|
| | pH = 10.5 | (25° C.) |
| Specific electric conductivity | $\kappa$ = 2.8 m$\Omega^{-1}\cdot$cm$^{-1}$ | (25° C.) |

EXAMPLE 5

Example 1 was repeated that the compounds of the ink employed in Example 1 were replaced by the following components:

| | wt. % |
|---|---|
| C.I. Acid Yellow 23 | 3.00 |
| Glycerin | 5.00 |
| Ethylene glycol | 10.00 |
| Triethanol amine | 0.20 |
| Polyoxyethylene oleyl amine (containing 15 ethylene oxide groups) | 0.50 |
| Preservative and anti-mold agent (organic nitrogen-sulfur-containing compound, trade name - Bioside 880, Taisho Co., Ltd.) | 0.20 |
| Ion-exchanged water | 81.10 |

The properties of the ink were:

| Surface tension | $\gamma$ = 51.0 dynes/cm | (25° C.) |
|---|---|---|
| Viscosity | $\eta$ = 1.65 cP | (30° C.) |
| | pH = 9.8 | (25° C.) |
| Specific electric conductivity | $\kappa$ = 3.7 m$\Omega^{-1}\cdot$cm$^{-1}$ | (25° C.) |

EXAMPLE 6

Example 1 was repeated except that the components of the ink employed in Example 1 were replaced by the following components:

| | wt. % |
|---|---|
| C.I. Acid Red 92 | 3.00 |
| Glycerin | 5.00 |
| Polyethylene glycol 200 | 10.00 |
| Triethanol amine | 0.20 |
| Polyoxyethylene oleyl amine (containing 15 ethylene oxide groups) | 0.30 |
| Dehydrosodium acetate | 0.20 |
| Ion-exchanged water | 81.30 |

The properties of the ink were:

| Surface tension | $\gamma$ = 53.0 dynes/cm | (25° C.) |
|---|---|---|
| Viscosity | $\eta$ = 1.66 cP | (30° C.) |
| | pH = 9.9 | (25° C.) |
| Specific electric conductivity | $\kappa$ = 3.3 m$\Omega^{-1}\cdot$cm$^{-1}$ | (25° C.) |

EXAMPLE 7

Example 1 was repeated except that the components of the ink employed in Example 1 were replaced by the following components:

| | wt. % |
|---|---|
| C.I. Acid Blue 9 | 3.00 |
| Polyethylene glycol 200 | 15.00 |
| Triethanol amine | 0.20 |
| Polyoxyethylene oleyl amine (containing 10 ethylene oxide groups) | 0.10 |
| Preservative and anti-mold agent - (Deltop 33, previously described) | 0.30 |
| Ion-exchanged water | 81.40 |

The properties of the ink were:

| Surface tension | $\gamma$ = 55.0 dynes/cm | (25° C.) |
|---|---|---|
| Viscosity | $\eta$ = 1.56 cP | (30° C.) |
| | pH = 9.8 | (25° C.) |
| Specific electric conductivity | $\kappa$ = 3.0 m$\Omega^{-1}\cdot$cm$^{-1}$ | (25° C.) |

Preferred embodiments of an aqueous ink for ink-jet printing of the type containing a polyoxyethylene alkyl phenyl ether represented by the previously described formula (II) or a polyoxyethylene alkyl ether represented by the previously described formula (III), according to the present invention, will now be explained by referring to the following examples 8 through 13:

EXAMPLE 8

Example 1 was repeated except that the components of the ink employed in Example 1 were replaced by the following components:

| | wt. % |
|---|---|
| C.I. Direct Black 19 | 3.25 |
| Glycerin | 4.00 |
| Diethylene glycol | 16.00 |
| Polyoxyethylene nonylphenyl ether (containing 18 ethylene oxide groups) | 0.40 |
| 2-pyridinethiol-1-oxide sodium salt | 0.30 |
| Ethylene diamine tetrasodium acetate | 0.01 |
| Ion-exchanged water | 76.04 |

The properties of the ink were:

| Surface tension | $\gamma$ = 47.0 dynes/cm | (25° C.) |
|---|---|---|
| Viscosity | $\eta$ = 1.8 cP | (30° C.) |
| | pH = 10.3 | (25° C.) |
| Specific electric conductivity | $\kappa$ = 2.3 m$\Omega^{-1}\cdot$cm$^{-1}$ | (25° C.) |

EXAMPLE 9

Example 1 was repeated except that the components of the ink employed in Example 1 were replaced by the following components:

| | wt. % |
|---|---|
| C.I. Direct Black 19 | 3.00 |
| Glycerin | 6.00 |
| Diethylene glycol | 12.00 |
| Polyoxyethylene alkyl ether (secondary alcohol having 15 | 0.30 |

-continued

| | wt. % |
|---|---|
| carbon atoms, with an adduct of a polyoxyethylene oxide, containing 12 ethylene groups) | |
| Preservative and anti-mold agent (an organic nitrogen-sulfur-containing compound, trade name - Deltop 33, described previously) | 0.20 |
| Ion-exchanged water | 78.50 |

The properties of the ink were:

| Surface tension | γ = 48.0 dynes/cm | (25° C.) |
|---|---|---|
| Viscosity | η = 1.7 cP | (30° C.) |
| | pH = 10.1 | (25° C.) |
| Specific electric conductivity | κ = 2.0 mΩ$^{-1}$·cm$^{-1}$ | (25° C.) |

EXAMPLE 10

Example 1 was repeated except that the components of the ink employed in Example 1 were replaced by the following components:

| | wt. % |
|---|---|
| C.I. Direct Black 19 | 3.25 |
| Glycerin | 6.67 |
| Diethylene glycol | 13.33 |
| Polyoxyethylene oleyl amine (containing 12 ethylene oxide groups) | 0.50 |
| Polyoxyethylene nonylphenyl ether (containing 15 ethylene oxide groups) | 0.30 |
| Preservative and anti-mold agent (Bioside 880, described previously) | 0.30 |
| Ethylene diamine tetrasodium acetate | 0.01 |
| Ion-exchanged water | 75.64 |

The properties of the ink were:

| Surface tension | γ = 46.0 dynes/cm | (20° C.) |
|---|---|---|
| Viscosity | η = 1.8 cP | (30° C.) |
| | pH = 10.3 | (25° C.) |
| Specific electric conductivity | κ = 2.3 mΩ$^{-1}$·cm$^{-1}$ | (25° C.) |

EXAMPLE 11

Example 1 was repeated except that the components of the ink employed in Example 1 were replaced by the following components:

| | wt. % |
|---|---|

$$H_2N-\underset{NH_2}{\underset{|}{\bigcirc}}-N=N-\bigcirc-N=N-\underset{SO_3Na}{\underset{|}{\bigcirc}}-\underset{NH_2}{\overset{OH}{\underset{|}{\bigcirc}}}-N=N-\bigcirc-NH_2$$

| (previously described dye C-1) | |
| Glycerin | |
| Diethylene glycol | |
| Triethylene glycol monomethyl ether | |
| Polyoxyethylene oleyl amine (containing 15 ethylene oxide groups) | |
| Polyoxyethylene alkyl ether (secondary alcohol having 17 carbon atoms, with an adduct of polyoxyethylene, containing 14 ethylene oxide groups) | |
| 2-pyridinethiol-1-oxide sodium salt | |
| Ion-exchanged water | |

The properties of the ink were:

| Surface tension | γ = 43.0 dynes/cm | (25° C.) |
|---|---|---|
| Viscosity | η = 1.9 cP | (30° C.) |
| | pH = 10.1 | (25° C.) |
| Specific electric conductivity | κ = 2.0 mΩ$^{-1}$·cm$^{-1}$ | (25° C.) |

EXAMPLE 12

Example 1 was repeated except that the components of the ink employed in Example 1 were replaced by the following components:

| | wt. % |
|---|---|
| C.I. Acid Red 94 | 2.0 |
| Glycerin | 7.0 |
| Diethylene glycol | 14.00 |
| Triethanol amine | 0.20 |
| Polyoxyethylene octylphenyl ether (containing 15 ethylene oxide groups) | 0.40 |
| 2,2-dimethyl-6-acetoxy-dioxane-1,3 | 0.20 |
| Ion-exchanged water | 76.20 |

The properties of the ink were:

| Surface tension | γ = 48.0 dynes/cm | (25° C.) |
|---|---|---|
| Viscosity | η = 1.9 cP | (30° C.) |
| | pH = 9.8 | (25° C.) |
| Specific electric conductivity | κ = 2.3 mΩ$^{-1}$·cm$^{-1}$ | (25° C.) |

EXAMPLE 13

Example 1 was repeated except that the components of the ink employed in Example 1 were replaced by the following components:

| | wt. % |
|---|---|
| C.I. Acid Red Blue | 2.0 |
| Glycerin | 7.0 |
| Diethylene glycol | 9.50 |

-continued

| | wt. % |
|---|---|
| Triethanol amine | 0.20 |
| Polyoxyethylene alkyl ether (secondary alcohol having 15 carbon atoms, with an adduct of polyoxyethylene, containing 12 ethylene oxide groups) | 0.15 |
| Polyoxyethylene nonylphenyl ether (containing 18 ethylene oxide groups) | 0.45 |
| Preservative and anti-mold agent (Deltop 33, described previously) | 0.30 |
| Ion-exchanged water | 73.90 |

The properties of the ink were:

| Surface tension | $\gamma$ = 46.0 dynes/cm | (25° C.) |
|---|---|---|
| Viscosity | $\eta$ = 1.9 cP | (30° C.) |
| | pH = 9.8 | (25° C.) |
| Specific electric conductivity | $\kappa$ = 3.0 m$\Omega^{-1} \cdot$ cm$^{-1}$ | (25° C.) |

COMPARATIVE EXAMPLE 1

Example 1 was repeated except that the components of the ink employed in Example 1 were replaced by the following components:

| | wt. % |
|---|---|
| C.I. Direct Black 154 | 3.30 |
| Polyethylene glycol 200 | 15.00 |
| Dehydrosodium acetate | 0.20 |
| Sodium thiosulfate | 0.01 |
| Ethylene diamine tetrasodium acetate | 0.01 |
| Ion-exchanged water | 81.48 |

The properties of the ink were:

| Surface tension | $\gamma$ = 58.0 dynes/cm | (25° C.) |
|---|---|---|
| Viscosity | $\eta$ = 1.65 cP | (30° C.) |
| | pH = 10.1 | (25° C.) |
| Specific electric conductivity | $\kappa$ = 2.2 m$\Omega^{-1} \cdot$ cm$^{-1}$ | (25° C.) |

COMPARATIVE EXAMPLE 2

Example 1 was repeated except that the components of the ink employed in Example 1 were replaced by the following components:

| | wt. % |
|---|---|
| C.I. Direct Black 19 | 3.00 |
| Polyethylene glycol | 13.00 |
| Triethylene glycol | 3.00 |
| 2,2-dimethyl-6-acetoxy-dioxane-1,3 | 0.20 |
| Ethylene diamine tetrasodium acetate | 0.01 |
| Ion-exchanged water | 80.79 |

The properties of the ink were:

| Surface tension | $\gamma$ = 55.0 dynes/cm | (25° C.) |
|---|---|---|
| Viscosity | $\eta$ = 1.7 cP | (30° C.) |
| | pH = 10.5 | (25° C.) |
| Specific electric conductivity | $\kappa$ = 2.5 m$\Omega^{-1} \cdot$ cm$^{-1}$ | (25° C.) |

COMPARATIVE EXAMPLE 3

Example 1 was repeated except that the components of the ink employed in Example 1 were replaced by the following components:

| | wt. % |
|---|---|
| C.I. Direct Black 19 | 3.50 |
| Glycerin | 3.75 |
| Diethylene glycol | 11.25 |
| 2-pyridine thiol-1-oxide sodium salt | 0.30 |
| Ion-exchanged water | 81.20 |

The properties of the ink were:

| Surface tension | $\gamma$ = 63.0 dynes/cm | (25° C.) |
|---|---|---|
| Viscosity | $\eta$ = 1.60 cP | (30° C.) |
| | pH = 10.5 | (25° C.) |
| Specific electric conductivity | $\kappa$ = 2.3 m$\Omega^{-1} \cdot$ cm$^{-1}$ | (25° C.) |

COMPARATIVE EXAMPLE 4

Example 1 was repeated except that the components of the ink employed in Example 1 were replaced by the following components:

| | wt. % |
|---|---|
| C.I. Direct Black 19 | 3.00 |
| Polyethylene glycol 200 | 20.00 |
| Polyoxyethylene nonylphenyl ether | 0.80 |
| 2-pyridine thiol-1-oxide sodium salt | 0.30 |
| Ion-exchanged water | 75.90 |

The properties of the ink were:

| Surface tension | $\gamma$ = 45.0 dynes/cm | (25° C.) |
|---|---|---|
| Viscosity | $\eta$ = 1.80 cP | (30° C.) |
| | pH = 9.8 | (25° C.) |
| Specific electric conductivity | $\kappa$ = 2.2 m$\Omega^{-1} \cdot$ cm$^{-1}$ | (25° C.) |

Examples 2 through 13 and Comparative Examples 1 through 4 were subjected to the same ink droplet ejection response tests as were done in Example 1. With respect to Example 2 through 13, the same excellent results were obtained as in Example 1. However, in Comparative Examples 1 through 4, the nozzles became partially clogged when the apparatus and ink were allowed to stand at normal room temperature and humidity for one week, and when the apparatus and ink were allowed to stand at 40° C./30% RH for one day, so that the direction of ejected ink droplets became extremely unstable and normal ink-jet printing was impossible.

What is claimed is:

1. An aqueous ink for ink-jet printing comprising (i) a water-soluble dye, (ii) a wetting agent selected from the group consisting of a polyhydric alcohol, an alkyl ether of a polyhydric alcohol, and mixtures thereof, (iii) water, and (iv) at least one water-soluble non-ionic surface active agent selected from the group consisting of:

compounds of the formula (I):

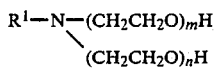

wherein $R^1$ is a chain hydrocarbon group having 16 to 19 carbon atoms, m is an integer of from 0 to 18, and n is an integer of from 0 to 18, wherein m+n equals 8 to 18;
compounds of the formula (II):

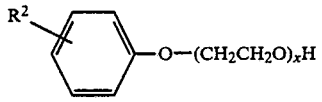

wherein $R^2$ is an alkyl group having 7 to 12 carbon atoms, and x is an integer of from 12 to 20; and compounds of the formula (III):

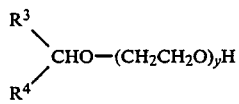

wherein $R^3$ and $R^4$ each is an alkyl group having 6 to 8 carbon atoms, and y is an integer of from 10 to 15, and mixtures thereof.

2. An aqueous ink for ink-jet printing as claimed in claim 1, wherein said water-soluble non-ionic surface active agent is a compound of said formula (I), and said group represented by $R^1$ in said formula (I) is an unsaturated chain hydrocarbyl group.

3. An aqueous ink for ink-jet printing as claimed in claim 2, wherein the amount of said compound of formula (I) in said aqueous ink is in the range of 0.01 weight percent to 2.00 weight percent.

4. An aqueous ink for ink-jet printing as claimed in claim 1, wherein said non-ionic surface active agent is selected from said compounds (II) and said compounds (III), and the amount of said non-ionic surface active agent in said aqueous ink is in the range of 0.01 weight percent to 1.00 weight percent.

5. An aqueous ink for ink-jet printing as claimed in claim 1, wherein said wetting agent is selected from the group consisting of glycerin, diethylene glycol, and mixtures thereof.

6. An aqueous ink for ink-jet printing as claimed in claim 1, wherein the pH of said aqueous ink is in the range of 9.0 to 11.0.

7. An aqueous ink for ink-jet printing according to claim 2, wherein $R^1$ is selected from the group consisting of oleyl, linoleyl and linolenyl.

8. An aqueous ink for ink-jet printing as claimed in claim 5, wherein the mixing ratio of glycerin to diethylene glycol is in the range of (1:1) to (1:5).

9. An aqueous ink for ink-jet printing as claimed in claim 5, further comprising a polyhydric alcohol other than glycerin, an alkyl ether of a polyhydric alcohol other than diethylene glycol, or a mixture thereof, the amount of said polyhydric alcohol, said alkyl ether or mixture thereof being not more than 40 weight percent of the total weight of glycerin and diethylene glycol.

10. An aqueous ink for ink-jet printing as claimed in claim 1, wherein said water-soluble dye is a direct dye.

11. An aqueous ink for ink-jet printing as claimed in claim 1, wherein said water-soluble dye is an acid dye of the formula:

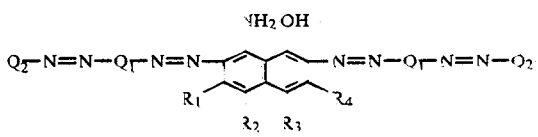

wherein $Q_1$ and $Q_2$ each are an unsubstituted benzene or naphthalene ring, or a benzene or naphthalene ring substituted by an amino, hydroxyl or sulfo group; $R_1$, $R_2$, $R_3$ and $R_4$ each represent hydrogen or a sulfo group, said sulfo groups being in the form of sodium salts, potassium salts, or quaternary ammonium salts, each molecule of said dye containing 2 to 6 sulfo groups.

12. An aqueous ink for ink-jet printing as claimed in claim 1, wherein said water-soluble dye is an acid dye of the formula:

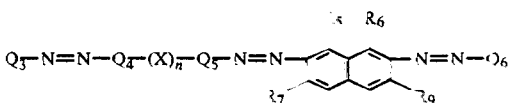

wherein $Q_3$ and $Q_6$ each represent an unsubstituted or substituted phenyl group, or an unsubstituted or substituted naphthyl group; $Q_4$ and $Q_5$ each represent an unsubstituted or substituted 1,4-phenylene group or naphthylene group; $R_5$ and $R_6$ each represent hydrogen, a hydroxyl group or amino group; $R_7$ and $R_8$ each represent hydrogen or a sulfo group, said sulfo groups being in the form of sodium salts, potassium salts or quaternary ammonium salts, each molecule containing 2 to 6 sulfo groups, x is —NH—, —N=N—, or —CH=CH—, and n is 0 or 1.

13. An aqueous ink for ink-jet printing as claimed in claim 1, wherein said water-soluble dye is an acid dye of the formula:

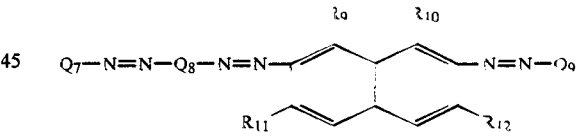

wherein $Q_7$ and $Q_9$ each represent an unsubstituted or substituted phenyl or naphthyl group; $Q_8$ represents an unsubstituted or substituted 1,4-phenylene, 1,4-naphthylene or 4,4'-biphenylene group; $R_9$ and $R_{10}$ each represent hydrogen, a hydroxyl group or an amino group; $R_{11}$ and $R_{12}$ each represent hydrogen or a sulfo group, said sulfo groups being in the form of sodium salts, potassium salts or quaternary ammonium salts, each molecule of said dye containing 2 to 6 sulfo groups.

14. An aqueous ink for ink-jet printing as claimed in claim 1, wherein said water-soluble dye is an acid dye of the formula:

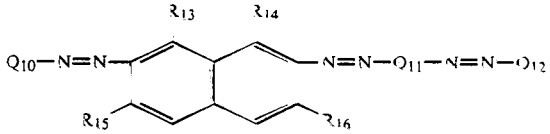

wherein $Q_{10}$ and $Q_{12}$ each represent an unsubstituted or substituted phenyl or naphthyl group; $Q_{11}$ represents an unsubstituted or substituted 1,4-phenylene, 1,4-naphthylene or 4,4′-biphenylene group; $R_{13}$ and $R_{14}$ each represent hydrogen, a hydroxyl group or an amino group; $R_{15}$ and $R_{16}$ each represent hydrogen or a sulfo group, said sulfo groups being in the form of sodium salts, potassium salts, or quaternary ammonium salts, each molecule of said dye containing 2 to 6 sulfo groups.

15. An aqueous ink for ink-jet printing as claimed in claim 1, further comprising at least one agent selected from the group consisting of a pH adjustment agent, a specific electric conductivity adjustment agent, a chelating agent, a rust preventing agent, a water-soluble preservative and anti-mold agent, a water-soluble ultraviolet ray-absorbing agent, a water-soluble infrared ray-absorbing agent, a magnetic fluid, and mixtures thereof.

16. An aqueous ink adapted for ink-jet printing consisting essentially of:
an effective amount of at least one water-soluble dye selected from the group consisting of acids dyes and direct dyes;
an effective amount of a wetting agent selected from the group consisting of polyhydric alcohols, alkyl ethers of polyhydric alcohols, and mixtures thereof;
0.01 to 2.00 wt.% of a non-ionic surface active agent selected from the group consisting of compounds of the formula

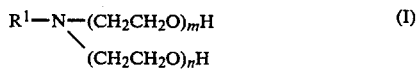

wherein $R^1$ is oleyl, linoleyl, or linolenyl, m is an integer of from 0 to 18 and n is an integer of from 0 to 18, with the proviso that the sum of $n+m$ is in the range of 8 to 18, and
the balance is essentially water, said ink having a pH in the range of 9.0 to 11.0 and a surface tension of at least 40 dynes/cm at 25° C.

17. An aqueous ink adapted for ink-jet printing, consisting essentially of:
an effective amount of at least one water-soluble dye selected from the group consisting of acids dyes and direct dyes;
an effective amount of a wetting agent which is a mixture of glycerin and diethylene glycol in which the weight ratio of glycerin:diethylene glycol is from 1:1 to 1:5;
0.01 to 1.00 wt.% of a non-ionic surface active agent selected from the group consisting of (a) compounds of the formula:

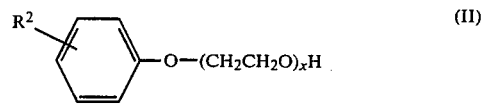

wherein $R^2$ is an alkyl group of 7 to 12 carbon atoms, and x is an integer of from 12 to 20, (b) compounds of the formula:

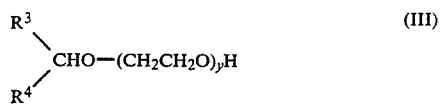

wherein $R^3$ and $R^4$ each represent an alkyl group having 6 to 8 carbon atoms, and y is an integer of from 10 to 15, and (c) mixtures thereof; and
the balance is essentially water, said ink having a pH in the range of 9.0 to 11.0 and a surface tension of at least 40 dynes/cm at 25° C.

18. An aqueous ink as claimed in claim 16, wherein said ink consists of said dye, said wetting agent, said non-ionic surface active agent, an effective amount of at least one member selected from a preservative and anti-mold agent, a chelating agent, and a rust preventing agent, and the balance is water.

19. An aqueous ink as claimed in claim 17, wherein said ink consists of said dye, said wetting agent, said non-ionic surface active agent, an effective amount of at least one member selected from a preservative and anti-mold agent, a chelating agent, and a rust preventing agent, and the balance is water.

20. An aqueous ink as claimed in claim 17, wherein said wetting agent contains up to 40 wt.%, based on the total weight of glycerin and diethylene glycol, of a polyhydric alcohol, an alkyl ether of a polyhydric alcohol, or a mixture thereof, said polyhydric alcohol and alkyl ether of a polyhydric alcohol being different from glycerin and diethylene glycol.

21. An aqueous ink as claimed in claim 20, wherein $R^2$ is an alkyl group of 8 to 10 carbon atoms, and n is an integer of from 13 to 19.

22. An aqueous ink as claimed in claim 1, wherein said wetting agent is selected from the group consisting of ethylene glycol, diethylene glycol, triethylene glycol, propylene glycol, glycerin, polyethylene glycol, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and mixtures thereof.

* * * * *

UNITED STATES PATENT AND TRADEMARK OFFICE
CERTIFICATE OF CORRECTION

PATENT NO. : 4 508 570
DATED : April 2, 1985
INVENTOR(S) : Tadashi Fujii et al

It is certified that error appears in the above-identified patent and that said Letters Patent is hereby corrected as shown below:

Column 20, line 25; change the formula to read as follows:

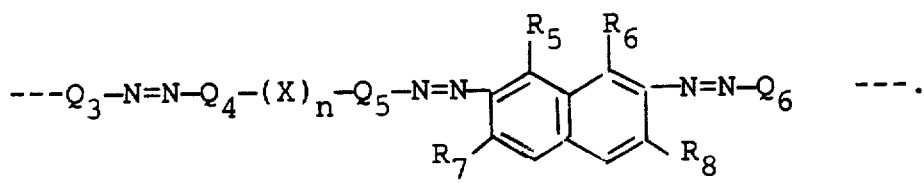

Signed and Sealed this

Twenty-ninth Day of October 1985

[SEAL]

Attest:

Attesting Officer

DONALD J. QUIGG

Commissioner of Patents and Trademarks—Designate